Patented May 29, 1934

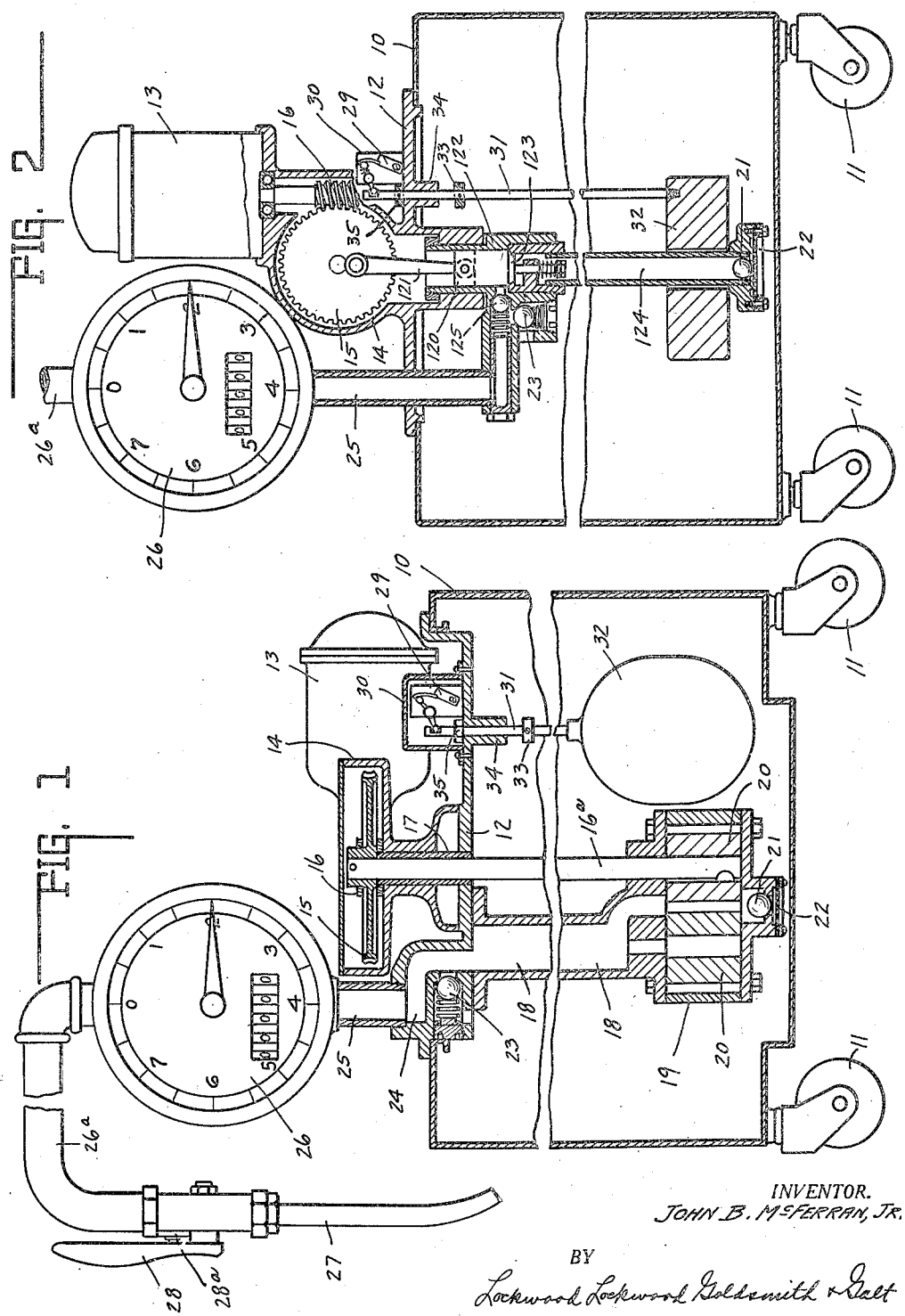

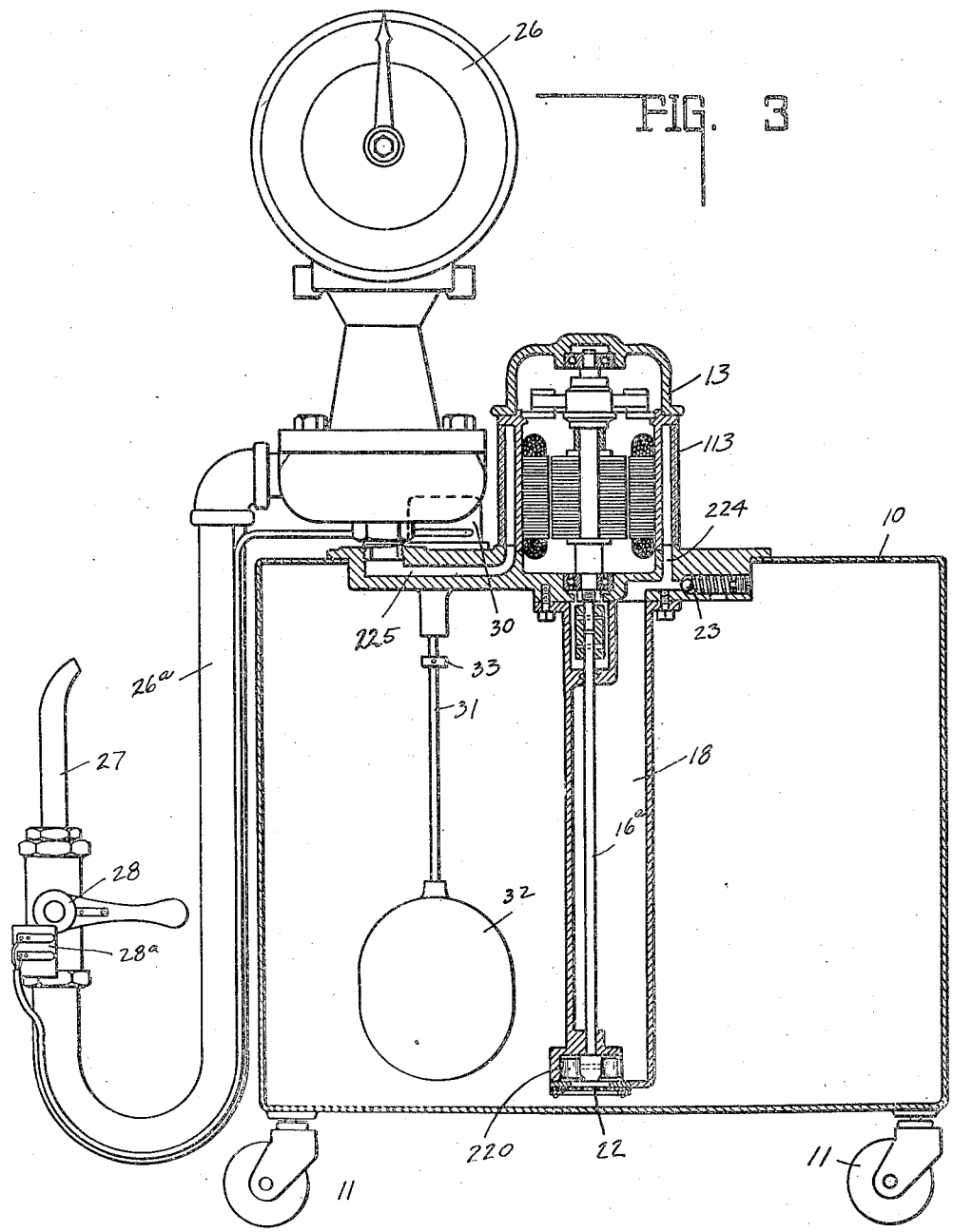

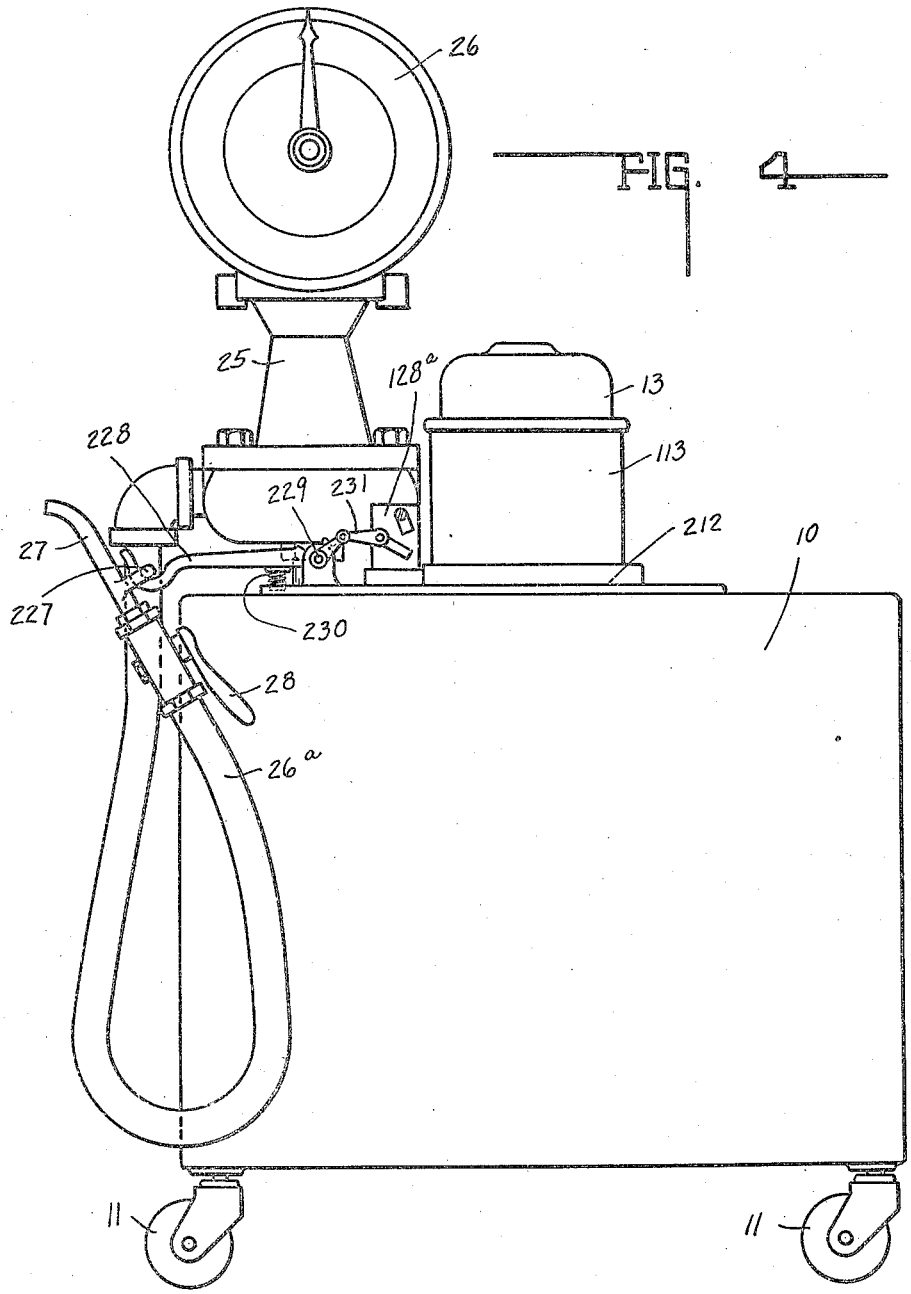

1,960,389

UNITED STATES PATENT OFFICE 1,960,389

OIL DISPENSING DEVICE

John B. McFerran, Jr., Louisville, Ky., assignor to Louisville Electric Manufacturing Company, Louisville, Ky., a corporation Application April 13, 1931, Serial No. 529,572

2 Claims. (Cl. 221—95)

This invention relates to a device for dispensing liquid, and particularly crank case oil to motor vehicles and the like.

Heretofore it has been customary to fill the crank case of a vehicle or the like with crank case oil by means of an oil can, cup or bottle which is filled from the tank with a small quantity of oil and carried to the vehicle.

The object of the invention is to provide a portable tank which may be conveniently rolled to the side of the vehicle and which will contain a substantial quantity of the lubricating oil. A desired amount of oil may then be pumped from the tank directly into the crank case or the like without requiring the intermediate transportation thereof in oil cans or bottles.

One feature of the invention resides in the electrically driven pump mechanism mounted upon and extending within the oil tank. Such mechanism is arranged so as to be removable therefrom and by-pass excessive oil back into the tank.

Another feature resides in the arrangement of a float control switch for automatically stopping the motor upon the oil tank reaching a predetermined low level such as would permit air to be pumped therefrom.

A further feature of the invention resides in the combination with the pump mechanism and tank, of a valve control discharge hose and nozzle communicating therewith in which there is provided a gauge for measuring the amount of oil pumped therethrough. Another feature of the invention resides in the provision of a window or glass cylinder through which the lubricant is adapted to circulate while being pumped so as to be observed by the purchaser. In mounting the same about the motor casing, a further advantage is gained due to the cooling of the motor by the passage of lubricant thereabout.

In the above mechanism, a readily portable oil dispensing device is provided at reasonable cost and so arranged as to conveniently discharge and meter out small or large quantities of oil as may be desired and which will become automatically inoperable upon the oil supply being reduced below the necessary level to insure proper dispensing thereof.

Another feature of the invention as shown in one of the modified forms resides in a support for the nozzle of the oil dispensing device which normally breaks the circuit to the electric motor, and when the nozzle is removed from the support for use, the switch is automatically actuated for closing the circuit to the motor and starting the pumping operation.

The full nature of the invention will be understood from the accompanying drawings and the following description and claims:

Fig. 1 is a central vertical section through the oil dispensing device showing a gear pump provided therein. Fig. 2 is the same as Fig. 1 showing a modified form employing a suction pump. Fig. 3 is the same as Figs. 1 and 2 showing a further modified form employing a centrifugal pump. Fig. 4 is a further modified form showing the nozzle support for controlling the circuit to the motor.

In the drawings there is shown an oil dispensing device particularly applicable for dispensing lubricating oil for filling crank cases and the like, which comprises a sheet metal tank 10 mounted upon the rollers or casters 11. Said tank is adapted to contain a substantial quantity of the lubricating oil. Removably mounted through a suitable opening in the top of the tank and for closing said opening, there is a pump mechanism comprising a supporting base 12 having a motor 13 mounted upon the upper side thereof. Supported above the base 12, there is a gear casing 14 containing a horizontally disposed worm gear 15 with which the worm 16 driven by the motor is housed. The worm gear 15 drives the shaft 16a which extends downwardly through the base 12 into the tank 10. Said shaft is supported and rotatable in the bearing 17 extending through the gear case 14 and base 12.

Suspended from the base 12 and supported thereby, there is an oil discharge conduit 18 which, in turn, supports the gear case 19. Mounted in said gear case, there is a pair of co-operating gears 20 forming the usual gear pump. The shaft 16a extends through the case 19 and is keyed to one of the gears 20. The bottom of the gear case 19 is provided with a valve control inlet 21 protected by the strainer 22.

Mounted in the base 12 and communicating with a continuation of the conduit 18 extending therethrough, there is a by-pass valve 23. The continuation of the conduit 18 which may be designated as 24 is formed in the base 12 and is in communication with the removable conduit 25 extending upwardly therefrom upon which there is mounted a gauge 26 for measuring the amount of oil dispensed through said conduits. The usual flexible hose 26a is connected with the upper end of the conduit 25, said hose being provided with the nozzle 27, valve 28, and motor control switch 28a.

A control switch 29 electrically connected with the motor 13 is mounted in the switch box 30 supported upon the base 12. Slidably mounted in the base 12, there is a float rod 31 having a float 32 on the lower end thereof. Said rod is adapted to slide in a suitable bearing formed in the base 12, the upper end thereof extending into the switch box 30, wherein it is operably connected with the switch 29.

In operation, assuming that there is a substantial quantity of lubricant in the tank 10, the float is elevated thereby until the stop 33 secured on the stem 31 abuts the lower end of the projection 34 on the base 12. In this position, the operable connection between the upper end of the stem 31 and the switch holds the switch in closed position so as to close the circuit therethrough leading to the motor 13. However, the motor is not driven until the motor control switch 28a, connecting the motor with a suitable source of power and controlling the circuit from the source of power through the switch 29 to the motor, is closed. The tank is rolled to a position near the vehicle and the nozzle 27 is inserted in the oil filler spout of the crank case thereof. The valve 28 is then opened, the position of the indicator of the dial 26 noted, and the master switch, not shown, is closed. The motor 13 will then drive the shaft 16a and pump 20 which will pump the oil through the conduits 18. 24, 25, and the hose 26a into the crank case. As the lubricant is thus pumped, the indicator, by reason of suitable calibration, will indicate the number of quarts of oil dispensed. When the desired amount is dispensed, the valve 28 is closed and the continued pumping will force the lubricant through the by-pass 23 until the master switch is opened and the motor cut off.

When the lubricant has been dispensed so as to reach a level below which air may be pumped through the conduit 18, the float 32 will drop to a position limited by the nut in which position the operative connection between the stem 31 and the switch 29 will open the switch and automatically stop the motor if it is in operation. Thus, no more lubricant can be pumped until the tank is refilled.

In the modified from shown in Fig. 2, the motor 13 drives a piston 120 through the medium of the worm 16, worm gear 15, and connecting rod 121. The piston 120 reciprocates in the cylinder 122 suspended from the base 12 within the tank 10. At the lower end of the piston 122, there is a valve 123 which opens and closes the upper end of the suction tube 124. The lower end of said tube is provided with the ball valve 21 and strainer 22, being positioned adjacent the bottom of the tank. Upon the upstroke of the piston 120, the lubricant from the tank 10 is sucked upwardly through the strainer 22, ball valve 21, suction tube 124 and valve 123 into the lower part of the cylinder 122. Upon the down-stroke of the piston, the valve 123 is closed and the lubricant is forced through the ball valve 125 into the conduit 25 connected with the indicator 26 and hose 26a, which, in turn, is connected as above described with the nozzle 27 having the valve 28. Upon closing the valve 28, the continued pumping action forces the lubricant through the by-pass 23 communicating with the conduit 25.

The float 32 in the modified form surrounds the tube 124 and slides vertically thereon, said float being operatively connected with the switch 29 by the rod 31 as above described in connection with the form shown in Fig. 1.

The operation of the device and the other mechanism is the same as above described with respect to Fig. 1.

In the modified form illustrated in Fig. 3, it will be noted that the motor 13 has a glass cylinder 113 surrounding the motor casing, the space between cylinder 113 and motor casing being in communication with the conduit 224. In this form, the motor 13 drives the centrifugal pump impeller 220 through the shaft 16a, whereby the lubricant is pumped through the conduit 18 to the intermediate space between the glass cylinder 113 and motor casing 13 at one side thereof, which is caused to pass within the cylinder and about the motor casing to the opposite side thereof, whereupon it passes out through the conduit 225 to the meter 26 and hose 26a.

Thus, the motor will be cooled by the swirled lubricant about the casing thereof and the purchaser of lubricant can observe the passage of lubricant through the glass cylinder 113 as it is being pumped into the crank case. While the glass cylinder surrounding the motor is shown herein for simplification only in respect to the second modified form, it is equally applicable to the other forms shown by directing the lubricant conduits to the motor before passing the same through the meter and hose.

Any suitable metering mechanism may be employed, as such mechanism per se forms no part of this invention. For simplification, the source of power to the motor and the wiring connections between said source of power and the switches 28a and 29 are not shown as being obvious to those familiar with the art.

In the modified form shown in Fig. 4, the nozzle 27 is provided with a supporting ring 227 supported upon the pivoted hook 228, said hook being pivotally secured to the base 212 of the motor 13 at 229. Said hook is provided with a yielding spring support 230 which is compressed by the weight of the nozzle when supported thereon, and which forces the hook upwardly when the nozzle is removed. The hook is operatively connected by the link 231 with the motor control switch 128a.

By means of this arrangement, when the nozzle is supported upon the hook 228, it will compress the spring 230 and break the circuit through the switch 128a so that the motor will be shut off. Upon the nozzle being removed for use, the spring 230 will act upon the hook 228 for closing the switch 128a and to make the circuit to the motor for operating the pump.

The invention claimed is:

1. A portable dispensing device for dispensing lubricating oil to the crank case of a vehicle including a portable tank for containing a substantial quantity of oil, a pump mounted in said tank, an electric motor mounted on said tank for driving said pump, a conduit through which the oil is pumped to be dispensed from said tank, and a transparent casing surrounding the casing of said motor and spaced therefrom through which the oil is caused to pass in being dispensed.

2. A portable dispensing device for dispensing lubricating oil to the crank case of a vehicle including a portable tank for containing a substantial quantity of oil, a pump mounted in said tank, an electric motor mounted on said tank for driving said pump, a conduit through which the oil is pumped to be dispensed from said tank, and a cylindrical glass casing surrounding the intermediate portion of the casing of said motor and spaced therefrom to provide a chamber, said chamber communicating with the conduit, whereby the oil will be caused to pass about said motor and be observed through said glass casing while affecting a cooling action on said motor prior to the final dispensing thereof.

JOHN B. McFERRAN, Jr.